Jan. 14, 1958   D. D. COY   2,819,654
MACHINE FIXTURE
Filed Aug. 6, 1952   2 Sheets-Sheet 1
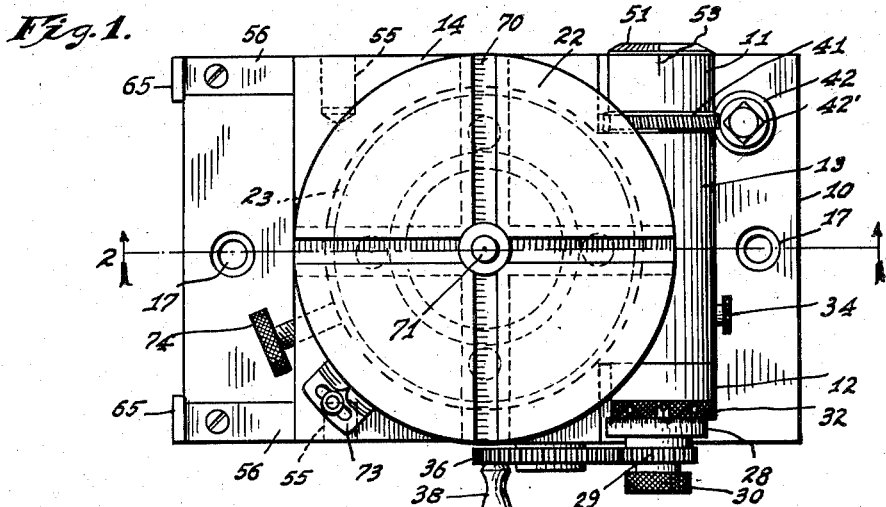
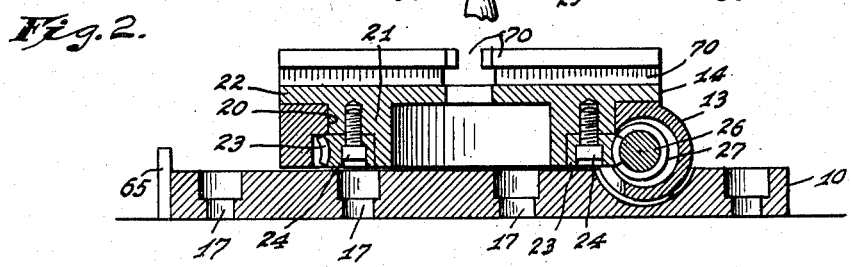
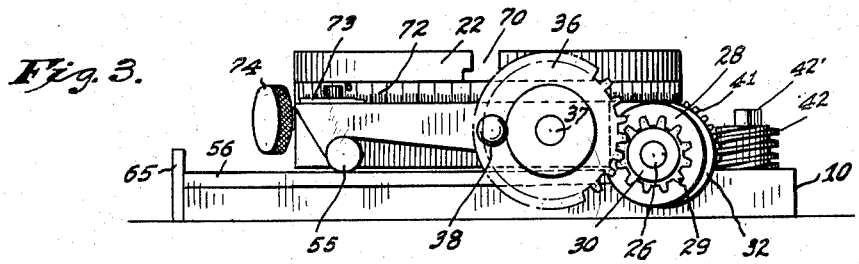
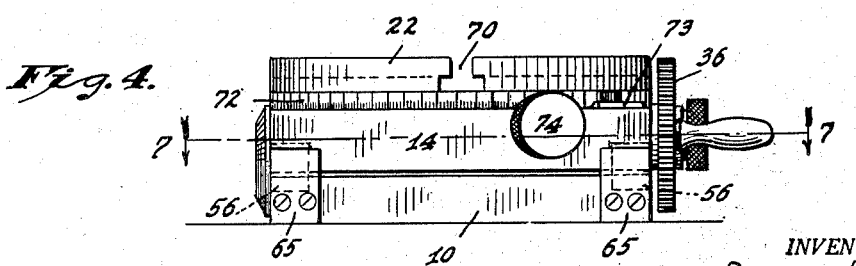
INVENTOR.
DELBERT D. COY,
BY
ATTORNEYS.

Jan. 14, 1958  D. D. COY  2,819,654
MACHINE FIXTURE
Filed Aug. 6, 1952  2 Sheets-Sheet 2
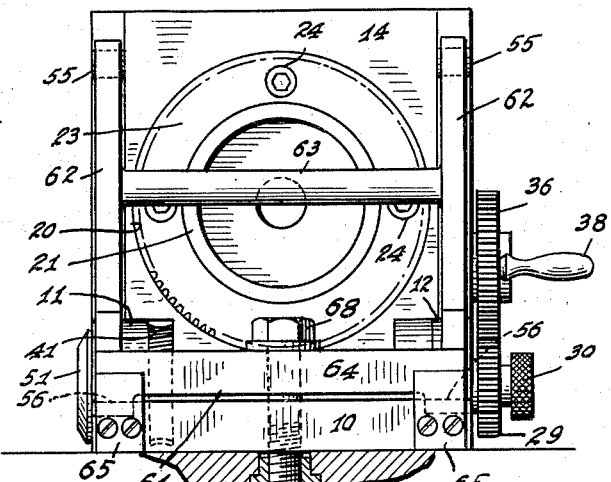
INVENTOR.
DELBERT D. COY,
BY
ATTORNEYS.

United States Patent Office 2,819,654
Patented Jan. 14, 1958

2,819,654

MACHINE FIXTURE

Delbert D. Coy, Muncie, Ind.

Application August 6, 1952, Serial No. 302,941

8 Claims. (Cl. 90—59)

This invention relates to a fixture for use with milling machines, jig bores, or the like and adapted to support work in any desired position of angular adjustment about each of two different axes. I am aware that the conventional dividing head is capable of supporting work for adjustments of the type indicated; but such dividing heads, because of their weight, height and relatively high cost are not too well adapted for certain types of work.

It is an object of this invention to produce a fixture which will provide the adjustments indicated, which can be light in weight and relatively low in height, which can be simply and economically manufactured, and which can be accurately adjusted.

A fixture constructed in accordance with the preferred form of the invention has a generally rectangular base to which a sub-base is pivoted for adjustment about a horizontal axis located at one end of the sub-base. Carried by the sub-base is a work-supporting head rotatable with respect to the sub-base about an axis which is spaced from and lies in a plane perpendicular to the axis of interconnection between the sub-base and base. Speed-reducing gear including a drive element supported from the base is desirably employed to effect fine adjustments of the head, such gearing conveniently including disengageable elements which can be disengaged to permit free and rapid rotation of the head for coarse adjustments thereof. If desired, speed-reducing gearing may also be employed to adjust the sub-base about its axis of pivotal connection with the base. Aligned cylindrical plugs carried by the sub-base at predetermined distances from the axis of sub-base mounting may be employed in combination with gauge plugs to set the base accurately on any predetermined angle with respect to the subbase. For angles up to about 45°, the gauge plugs may be used directly to measure the elevation of the plugs; while for larger angles, gauge plugs may be used in association with an angle plate to measure the horizontal disposition of the plugs.

The accompanying drawings illustrate the invention.

Fig. 1 is a plan view of the fixture showing the sub-base in horizontal position;

Fig. 2 is a vertical section on the line 2—2 of Fig. 1;

Figs. 3 and 4 are side and end elevations respectively of the fixture with the sub-base in horizontal position;

Figs. 5 and 6 are respectively a rear and a side elevation, each in partial section, illustrating the sub-base in elevated position and showing the angle plate which may be employed in setting the sub-base at larger angles of inclination; and Fig. 7 is a fragmental horizontal section on the line 7—7 of Fig. 4.

The fixture illustrated in the drawing comprises a rectangular base 10 having near one end a pair of spaced, upwardly projecting bosses 11 and 12 receiving between them a barrel-like hub 13 located at one end of and integral with a sub-base 14. Coaxial pivot members 15 and 16 (Fig. 7) extend through the bosses 11 and 12 into the sub-base hub 13. The base 10 may be provided with counterbored holes 17 for use in clamping it in fixed position to the table of a machine tool such as a milling machine or jig borer.

Near its center, the sub-base 14 is provided with a large circular opening 20 which rotatably receives a hub 21 of a circular work-supporting table or head 22. To retain the head 22 in position on the sub-base 14, the lower end of the hub 21 is reduced in diameter and the lower end of the opening 20 is counterbored to receive a retaining ring 23, which conveniently is a worm gear employed in angularly adjusting the head 22 in a manner hereinafter set forth. Screws 24 extending through the gear 23 and into the hub 21 secure the gear to the head.

Rotatably mounted within the pivot member 16 is a shaft 26 which carries at its inner end a worm 27 meshing with the gear 23 just described. At its outer end, the shaft 26 carries a graduated collar 28, a gear 29 and an adjusting knob 30. The collar 28 is desirably rotatable on the shaft 26 and is adapted to be secured thereto, in any desired position of angular adjustment, as by means of a set screw 28'. The gear 29 is conveniently mounted on and keyed to a reduced-diameter portion of the shaft 26 which, outwardly beyond the gear, is screw-threaded for the reception of the knob 30, which can be employed to clamp the gear 29 in position.

As will be obvious, rotation of the shaft 26 and worm 27 by operation of the knob 30 will rotate the gear 23 and with it the head 22. As previously indicated, it is desirable to provide for disconnection of the shaft 26 from the head 22 so that the latter may be given quick, coarse adjustments. To accomplish this purpose in the structure illustrated, the shaft 26 is mounted eccentrically in the pivot member 16, and the pivot member is rotatable in the boss 12 and hub 13 to permit the worm 27 to be moved into and out of engagement with the gear 23. To facilitate gear-engaging and gear disengaging rotation of the pivot member 16, it is conveniently provided with an integral annular flange 32 which lies between the boss 12 and the graduated collar 28 and which is provided in its periphery with a series of openings 33 adapted to receive a spanner or other tool by means of which the pivot member 16 may be rotated. To lock the pivot member 16 in the position it occupies when the worm 27 engages the gear 23, I may employ a lock pin 34 radially slidable in the head 13 to permit its inner end to be inserted into or withdrawn from a properly located hole in the pivot member 16.

The gear 29 meshes with a gear 36 rotatably supported on a pin 37 carried by the sub-base 14 and provided with an eccentric operating handle 38. As shown, the gear 36 is considerably larger than, and preferably twice the size of, the gear 29 so that it can be rotated through the handle 38 to impart to the shaft 26 a more rapid rate of rotation than is possible by manipulation of the knob 30.

If desired, gearing may be employed to adjust the sub-base about the common axis of the pivot members 15 and 16. As shown in the drawing, the pivot member 15 is rigidly secured to the hub 13 of the sub-base by a set screw 40 (Fig. 7) and has rigidly connected to it a worm gear 41 meshing with a worm 42 pivotally supported on a vertical axis from the base 10. The worm 42 conveniently has a square or other non-circular upper end 42' for attachment of a key or wrench by which it may be rotated.

The gear 41 conveniently lies against the inner face of the boss 11, and the sub-base hub 13 is just long enough to fill the space between the gear 41 and the boss 12, thus locating the sub-base in fixed position along the common axis of the pivot members 15 and 16. As a result of this construction, when the gear 41 is not in position there exists a possibility of axial movement of the hub 13 between the bosses 11 and 12, and such possibility of axial movement is utilized in connection with the means employed to locate the pivot member 16 axially of itself. As will be clear from Fig. 7, that end of the hub 13 which lies adjacent the boss 12 is counterbored to permit reception of a collar 45 screw-threadedly mounted on the pivot member 16. In assembling the base and sub-base, the shaft 26 is first inserted into the pivot member 16. With the gear 41 out of position and the hub 13 at the leftward limit of its movement between the bosses 11 and 12, there will be provided between the boss 12 and the adjacent end of the hub 13 a space which permits the collar 45 to be positioned at the inner face of the boss 12 in alignment with the opening therein. The pivot member 16 is then inserted through the boss 12 and collar 45 into the hub 13. Rotation of the collar screws it on to the screw threads provided on the pivot member 16 and thus prevents withdrawal of such pivot member. Because of the screw threads on the pivot member 16, that member has a larger diameter within the boss 12 than it has within the hub 13, and the resultant shoulder at the inner end of the larger diameter portion provides an abutment preventing the collar 45 from being tightened on the screw threads to such an extent that the boss 12 would be clamped between the collar and the flange 32 and further rotation of the pivot member thereby prevented.

With the collar 45 tightened, the sub-base 14 is then moved to the right (Fig. 7) to permit the worm gear 41 to be inserted into position between the hub 13 and the boss 11. The pivot member 15 is then inserted through the boss 11 and gear 41 into the hub 13 to which it is rigidly connected by the set screw 40. To provide for the desired rigid connection between the gear 41 and the pivot member 15, the gear is provided with a keyway 47 adapted to receive a pin 48 radially slidable in the pivot member 15. The latter has at its outer end a screw-threaded, axially extending hole receiving a screw 49 which has a conical point and which can be screwed inwardly until such point engages the inner end of the pin 48 and forces such pin outwardly into the keyway 47.

With the device assembled as described, the pivot member 15 is rigidly connected to the sub-base 14 by the screw 40 and the gear 41 is in turn rigidly connected to the pivot member, so that upon rotation of the worm 42 the sub-base will be adjusted about its axis of connection with the base. If desired, a graduated dial 51 may be secured to the outer end of the pivot member 15 by a screw 52 received in the same hole as that which receives the screw 49. An index 53 provided on the boss 11 co-operates with the graduations on the dial 51 to indicate the angle of inclination of the sub-base.

For the purpose of angularly adjusting the sub-base more accurately than can be accomplished by the dial 51, the sub-base may be provided on opposite sides with a pair of aligned cylindrical plugs 55 disposed on a common axis parallel to the axis of interconnection of the base and sub-base and accurately located at a predetermined distance from the latter axis. Further, the common plane occupied by the axis of the plugs 55 and the axis of interconnection of the base and sub-base is perpendicular to the axis of rotation of the head 22 and the sub-base. As a result, the distance of the plugs above the base will be a measure of the inclination of the base and of the inclination of the axis of the head 22.

Elevation of the blocks 55 above the base 10 is conveniently measured with the aid of gauge blocks, and with that in view the base 10 may be provided beneath each plug 55 with a hardened facing strip 56. The upper faces of the strips 56, after those strips are attached to the base, are ground to occupy a common plane accurately parallel to the axis of the sub-base and located vertically at a predetermined distance from such axis. Conveniently, the common plane of the upper surfaces of the strips 56 is located below the sub-base axis by a distance equal to the radius of the plugs 55, so that when the plugs 55 rest on the strips 56 the sub-base will be accurately horizontal and the axis of the head 22 accurately vertical. Further, in any inclined position of the sub-base, the distance between each plug 55 and the strip 56 below it will be equal to the product of the sine of the angle of sub-base inclination and the distance between the axes of the plugs 55 and of the sub-base. To set the sub-base at any desired angle, the sine of that angle is multiplied by the distance between the axes of the plugs and sub-base, gauge blocks whose aggregate thicknesses equal the product are then stacked on one or each of the strips 56, and the sub-base lowered until the plug 55 rests on the upper gauge block. Of course, if there is a difference between the radius of the plugs 55 and the distance of the sub-base axis above the strips 56, such difference must be taken into account in selecting the gauge blocks.

The above described method of setting the sub-base at any predetermined angle is not accurate for angles approaching 90°; for with the sub-base near the vertical, changes in its angle of inclination produce comparatively slight changes in elevation of the plugs 55. For setting the sub-base at angles near the vertical, therefore, I may employ the angle plate indicated in its entirety by the reference numeral 60 in Fig. 6. Such angle plate, as shown, comprises a horizontal web 61, two end members 62, and a cross brace 63 extending between the end members 62 above the web 61 to impart rigidity to the structure. The lower surface of the angle plate rests on the upper faces of the strips 56. The two end members 62 are located respectively in the planes of the plugs 55 and have front faces 62' adapted to engage such plugs. The front faces 62' are coplanar and are accurately perpendicular to the lower face of the angle plate. The angle plate, near its bottom, is provided with a rear face 64 which is accurately parallel with the faces 62' and which occupies a plane spaced a known distance from the common plane of the faces 62'.

If the angle plate 60 is to be used, the base 10 may be provided at its rear corners with abutments 65 having coplanar, vertical front faces parallel to the sub-base axis and located at a known distance therefrom. By inserting gauge blocks as indicated at 66 between the rear face 64 of the angle plate and the front faces of the abutments 65, the angle plate can be accurately positioned with the plane of the front faces 62' of the end members 62 at any desired horizontal distance from the axis of the sub-base. With the plugs 55 in contact with the faces 62', the inclination of the sub-base will therefore be known.

To hold the angle plate in any desired position of adjustment the web 61 may be provided at its center with an elongated slot adapted to receive a screw 68 which, extending through the web and one of the holes 17 in the base, can be employed to clamp the angle plate in fixed position on the base and the base in fixed position on the table of a machine tool.

The sides of the base 10 are desirably finished to be accurately perpendicular to the vertical plane containing the axis of the sub-base, so that such side surfaces can be employed in accurately positioning the fixture on the table of the machine tool with which it is to be used. Accurate positioning of the fixture may also be facilitated by finishing the end faces of the base to be accurately parallel with the sub-base axis.

The head 22 is conveniently provided with two diametrically extending T-slots 70 which are disposed perpendicularly to each other and which may be used in clamping work on the upper face of the head. If desired, the head may have a central opening accurately coaxial with the hub 21, so that a shouldered plug 71 inserted in such hole may be employed in positioning a piece of work accurately concentric with the head.

The head may have an annular series of graduations 72 co-operating with an index member 73 secured to the sub-base to measure changes in the angular position of the head. A locking screw 74 screw-threadedly mounted in the sub-base 14 and extending therethrough into contact with the hub 21 may be employed to clamp the head in any position of adjustment about its axis.

In using the device, the base 10 is clamped to the table of a machine tool by screws inserted through the holes 17. The above described relationship of the side and end faces of the base with the sub-base axis facilitates disposition of the fixture in the desired orientation with respect to the direction in which the machine-tool table moves. If it is desired to use the fixture merely to effect measured adjustments of the work about a vertical axis, the sub-base is lowered until the plugs 55 engage the strips 56. With the work clamped on the face of the head 22, the worm 27 can be operated, either directly by rotation of the knob 30 or at increased speed by rotation of the gear 36, to effect the desired changes of angular adjustment. Because of the speed-reduction provided by the worm-gearing 23—27, the graduated dial 28 enables very accurate setting of the head to be made. Once the head is set in any desired position of angular adjustment about its vertical axis, the clamp screw 74 may be tightened to hold the head in its adjusted position. For quick and coarse adjustments of the head, the bushing 16 may be rotated to move the worm 27 out of engagement with the gear 23, thus permitting the head to be rotated by the application of direct manual effort.

It will be noted that the axial extent of the bearing of the hub 21 within the sub-base is comparatively short. Reliance for maintaining the axis of the head perpendicular to the sub-base is therefore placed not on the interengaging surfaces of the hole 20 and hub 21 but instead is placed primarily on the engagement of the upper face of the sub-base with the lower surface of the head surrounding the hub. These surfaces desirably engage each other substantially uninterruptedly over the circumferential extent of the head.

If it is desired to adjust the work about an axis disposed at an angle to the vertical, the sub-base is inclined to the desired extent, conveniently with the aid of gauge blocks, in the manner set forth. In any angular position of the sub-base, the gear 23 can be rotated through the gearing 23—27 to effect angular positioning of the head about its axis. Control of the angular disposition of the sub-base through the worm-gearing 41—42 is of advantage; for such gearing is irreversible and hence prevents the sub-base from swinging downwardly under the influence of gravity and causing the plugs 55 to strike the strips 56 or gauge-blocks supported thereon with sufficient force to damage the plugs, the strips, or the gauge blocks.

I claim as my invention:

1. A fixture of the type described, comprising a base, a sub-base above and pivoted to the base on a first axis at one side of the sub-base, a work-supporting head rotatably mounted in said sub-base on a second axis which is offset a fixed distance from the first axis and which lies in a plane normal to the first axis, a worm gear rigid with said head, a worm meshing with said gear, and means for supporting said worm from said sub-base with its axis substantially concentric with said first axis.

2. A fixture as set forth in claim 1 with the addition that said means is movable to permit disengagement of said worm and gear.

3. A fixture as set forth in claim 1 with the addition that said means comprises a rotatable member, said worm being mounted in said rotatable member on an eccentric axis.

4. A fixture as set forth in claim 1 with the addition of speed-increasing gearing mounted on said sub-base for rotating said worm.

5. A fixture of the type described, comprising a base having a plane lower surface adapted for movement over the work table of a machine tool, a sub-base above and pivoted to the base on a first axis at one side of the sub-base, a work-supporting head rotatably mounted in said sub-base on a second axis which is offset a fixed distance from the first axis and which lies in a plane normal to the first axis, means acting between said sub-base and head for holding the head in a fixed position of adjustment about said second axis, and speed-reducing gearing for adjusting said sub-base about said first axis.

6. A fixture as set forth in claim 5 with the addition that said head is provided with a circular opening on said second axis, said opening extending into the upper face of said head and being adapted to removably receive a work-locating plug.

7. A fixture as set forth in claim 1 with the addition that said means comprises a pivot member rotatable relatively to both said base and sub-base about the axis of their pivotal interconnection, a shaft extending through said pivot member on an axis parallel to the axis of the pivot member, said worm being rigidly mounted on one end of said shaft, the other end of said shaft projecting beyond said pivot member for application of a worm-rotating torque, said shaft-axis being offset from the axis of said pivot member whereby the worm may be moved into or out of disengagement with the worm gear by rotation of the pivot member relative to the sub-base.

8. A fixture as set forth in claim 7 with the addition of releasable means acting between the sub-base and the pivot member for locking the pivot member in worm-engaging position.

References Cited in the file of this patent

UNITED STATES PATENTS

| Number | Name | Date |
|---|---|---|
| 1,029,656 | Zimmermann | June 18, 1912 |
| 1,100,522 | Brown et al. | June 16, 1914 |
| 1,834,794 | Weddell | Feb. 2, 1932 |
| 1,942,927 | Johnson | Jan. 9, 1934 |
| 1,997,916 | Rusnak | Apr. 16, 1935 |
| 2,364,478 | Schreiber | Dec. 5, 1944 |
| 2,570,444 | Henkel | Oct. 9, 1951 |
| 2,574,914 | Du Bois | Nov. 13, 1951 |
| 2,589,489 | Fuhr | Mar. 18, 1952 |
| 2,595,424 | Studler | May 6, 1952 |
| 2,610,552 | Victory | Sept. 16, 1952 |

FOREIGN PATENTS

| Number | Country | Date |
|---|---|---|
| 508,193 | France | July 19, 1920 |
| 717,363 | Germany | Feb. 12, 1942 |
| 605,884 | Great Britain | Aug. 3, 1948 |